(12) United States Patent
Yamada et al.

(10) Patent No.: US 10,658,706 B2
(45) Date of Patent: May 19, 2020

(54) AQUEOUS ELECTROLYTIC SOLUTION FOR POWER STORAGE DEVICE AND POWER STORAGE DEVICE INCLUDING SAID AQUEOUS ELECTROLYTIC SOLUTION

(71) Applicants: THE UNIVERSITY OF TOKYO, Bunkyo-ku, Tokyo (JP); KABUSHIKI KAISHA TOYOTA JIDOSHOKKI, Kariya-shi, Aichi-ken (JP)

(72) Inventors: Atsuo Yamada, Tokyo (JP); Yuki Yamada, Tokyo (JP); Kenji Usui, Tokyo (JP); Junichi Niwa, Kariya (JP); Tomoyuki Kawai, Kariya (JP)

(73) Assignees: THE UNIVERSITY OF TOKYO, Tokyo (JP); KABUSHIKI KAISHA TOYOTA JIDOSHOKKI, Kariya-shi (JP)

( * ) Notice: Subject to any disclaimer, the term of this patent is extended or adjusted under 35 U.S.C. 154(b) by 84 days.

(21) Appl. No.: 16/069,953

(22) PCT Filed: Jan. 6, 2017

(86) PCT No.: PCT/JP2017/000320
§ 371 (c)(1),
(2) Date: Jul. 13, 2018

(87) PCT Pub. No.: WO2017/122597
PCT Pub. Date: Jul. 20, 2017

(65) Prior Publication Data
US 2019/0044190 A1 Feb. 7, 2019

(30) Foreign Application Priority Data
Jan. 14, 2016 (JP) ................... 2016-005505

(51) Int. Cl.
*H01M 10/36* (2010.01)
*H01G 11/60* (2013.01)
(Continued)

(52) U.S. Cl.
CPC ............ *H01M 10/36* (2013.01); *H01G 11/60* (2013.01); *H01G 11/62* (2013.01); *H01G 11/64* (2013.01);
(Continued)

(58) Field of Classification Search
CPC ................. H01M 10/22; H01M 10/36; H01M 2300/0002; H01G 11/60
(Continued)

(56) References Cited

U.S. PATENT DOCUMENTS 6,645,667 B1 11/2003 Iwamoto et al.
2010/0136427 A1* 6/2010 Kondo ................... H01M 4/485
429/207

(Continued)

FOREIGN PATENT DOCUMENTS

CN 1319263 A 10/2001
CN 102034611 A 4/2011
(Continued)

OTHER PUBLICATIONS

International Search Report for PCT/JP2017/000320 dated Mar. 14, 2017 [PCT/ISA/210].
(Continued)

*Primary Examiner* — James M Erwin
(74) *Attorney, Agent, or Firm* — Sughrue Mion, PLLC

(57) ABSTRACT

An electrolytic solution for a power storage device, the electrolytic solution containing water as a solvent, wherein an amount of the solvent is greater than 4 mol and not greater than 15 mol with respect to 1 mol of an alkali metal salt.

14 Claims, 6 Drawing Sheets

(51) Int. Cl.

| | | |
|---|---|---|
| H01G 11/62 | (2013.01) | |
| H01M 4/587 | (2010.01) | |
| H01G 11/64 | (2013.01) | |
| H01M 4/583 | (2010.01) | |
| H01M 4/66 | (2006.01) | |
| H01G 11/34 | (2013.01) | |
| H01G 11/68 | (2013.01) | |

(52) U.S. Cl.
CPC .......... H01M 4/583 (2013.01); H01M 4/587 (2013.01); H01M 4/661 (2013.01); H01G 11/34 (2013.01); H01G 11/68 (2013.01); H01M 2300/0002 (2013.01); Y02E 60/13 (2013.01)

(58) Field of Classification Search
USPC .......................................................... 429/199
See application file for complete search history.

(56) References Cited

U.S. PATENT DOCUMENTS

2011/0075323 A1  3/2011  Kawakami et al.
2011/0318614 A1  12/2011  Takeshi et al.

FOREIGN PATENT DOCUMENTS

| JP | 9-022722 A | 1/1997 |
|---|---|---|
| JP | 2007-112704 A | 5/2007 |
| JP | 2010-192346 A | 9/2010 |
| WO | 2013/146792 A1 | 10/2013 |

OTHER PUBLICATIONS

Communication dated Apr. 30, 2019, from the China National Intellectual Property Administration in counterpart Application No. 201780006800.6.
Gérald Perron et al., "Comparison of the thermodynamic and transport properties of lithium bis(trifluoromethylsulfonyl)imide (LiTFSI) with LiClO$_4$ and Bu$_4$NBr in water at 25°C.", Canada Journal of Chemistry, 1997, vol. 75, pp. 1608-1614(8 pages total).
Liumin Suo et al., ""Water-in-salt" electrolyte enables high-voltage aqueous lithium-ion chemistries", Research Articles, Science, Nov. 20, 2015, vol. 350, Issue 6263, pp. 938-943(7 pages total).
Communication dated Jan. 6, 2020 by the China National Intellectual Property Administration in Application No. 201780006800.6.

* cited by examiner

AQUEOUS ELECTROLYTIC SOLUTION FOR POWER STORAGE DEVICE AND POWER STORAGE DEVICE INCLUDING SAID AQUEOUS ELECTROLYTIC SOLUTION

CROSS REFERENCE TO RELATED APPLICATIONS

This application is a National Stage of International Application No. PCT/JP2017/000320, filed on Jan. 6, 2017, which claims priority from Japanese Patent Application No. 2016-005505, filed on Jan. 14, 2016.

TECHNICAL FIELD

The present invention relates to an aqueous electrolytic solution for a power storage device and a power storage device including the aqueous electrolytic solution.

BACKGROUND ART

Lithium ion secondary batteries have been widely used as batteries for mobile phones and electric vehicles, since lithium ion secondary batteries have high theoretical energy densities as compared to conventional secondary batteries. In conventional lithium ion secondary batteries, an organic solvent-based electrolytic solution that does not decompose even at a voltage of approximately 4 V is used in order to achieve a high energy density. As such an organic solvent, typically, ethylene carbonate, diethyl carbonate, etc. are mainly used (Patent Literature 1).

However, an organic solvent is generally combustible, and thus ensuring safety particularly in large-sized secondary batteries for vehicles and power storage is an important issue. In addition, the ionic conductivity of an organic solvent solution is very low as compared to that of an aqueous solution, so that rapid charging/discharging characteristics of the organic solvent solution are not sufficient, which is a problem. Meanwhile, in view of such a problem, research has been conducted for aqueous lithium ion secondary batteries in which an aqueous solution is used as an electrolytic solution. However, water theoretically decomposes at a voltage of 1.23 V, and thus an aqueous lithium ion secondary battery that stably operates even at a high voltage that is not less than this voltage has not been achieved.

Capacitors are power storage devices which store or release charge by adsorption or elimination of ions in an electrolytic solution with respect to an electrode surface. Capacitors are roughly categorized into: organic solvent-type capacitors in which an organic solvent and a quaternary ammonium salt or the like are used for an electrolytic solution; and aqueous capacitors in which water is used as the solvent of an electrolytic solution.

The amount of charge that is stored in a capacitor is represented as a product of capacitance and voltage. Regarding an aqueous capacitor, the upper limit of the voltage is limited due to the withstand voltage of water, and thus studies for increasing the capacitance are generally conducted in order to increase the amount of charge.

As a matter of fact, Patent Literature 2 discloses a technique of an aqueous capacitor to optimize the pore size and the specific surface area of activated carbon to be used for an electrode of a capacitor, thereby increasing capacitance.

However, since the withstand voltage of water is low as described above, putting an aqueous capacitor that stably operates at a high voltage to practical use has been difficult.

CITATION LIST

Patent Literature

Patent Literature 1: JPH09-22722(A)
Patent Literature 2: JP2007-112704(A)

SUMMARY OF INVENTION

Technical Problem

Therefore, the objectives of the present invention are: to provide a novel aqueous electrolytic solution for a power storage device such as secondary batteries, including a lithium ion secondary battery, and capacitors; and to provide a power storage device in which the aqueous electrolytic solution is used and which stably operates even at a relatively high voltage.

Solution to Problem

For the purpose of solving the above described problems, the present inventors have conducted thorough research. As a result, the present inventors have discovered that an electrolytic solution that is an aqueous solution containing an alkali metal salt at a high concentration in which the amount of a solvent is not greater than 4 mol with respect to 1 mol of an alkali metal salt has a potential window of not less than 2 V which greatly exceeds 1.23 V which is the theoretical potential window (stable potential range) of pure water and that an aqueous power storage device in which the electrolytic solution is used operates reversibly at a high voltage. The technical contents thereof have been reported in Japanese Patent Application No. 2015-4889.

As a result of further research, the present inventors have discovered that even an electrolytic solution having a concentration other than the concentration described in the previous paragraph has a potential window exceeding 1.23 V. Then, the present inventors have accomplished the present invention.

Specifically, the electrolytic solution of the present invention is an electrolytic solution for a power storage device, the electrolytic solution containing water as a solvent, wherein an amount of the solvent is greater than 4 mol and not greater than 15 mol with respect to 1 mol of an alkali metal salt.

Advantageous Effects of Invention

According to the present invention, by using, as an electrolytic solution, an aqueous solution containing an alkali metal salt at a high concentration, particularly, an alkali metal salt of an organic anion and an alkali metal cation, an aqueous power storage device, such as a secondary battery including a lithium ion secondary battery and a sodium ion secondary battery, and a capacitor, in which an aqueous electrolytic solution is used and that stably operates even at a high voltage exceeding 1.23 V, which is difficult with a conventional aqueous electrolytic solution, is provided.

In addition, the electrolytic solution of the present invention is an electrolytic solution obtained by combining water, which is a very cheap solvent, and an organic salt such as LiTFSA, which is used as a component in a conventional electrolytic solution. Thus, the electrolytic solution of the present invention is excellent in terms of cost. Furthermore, as described in Examples described later, the electrolytic solution of the present invention is applicable to an electrode configuration that has been put to practical use as a lithium ion secondary battery or a capacitor in which an existing organic electrolytic solution is used. Thus, an obstacle to putting the electrolytic solution to practical use is very low.

DESCRIPTION OF EMBODIMENTS

Figure 1:
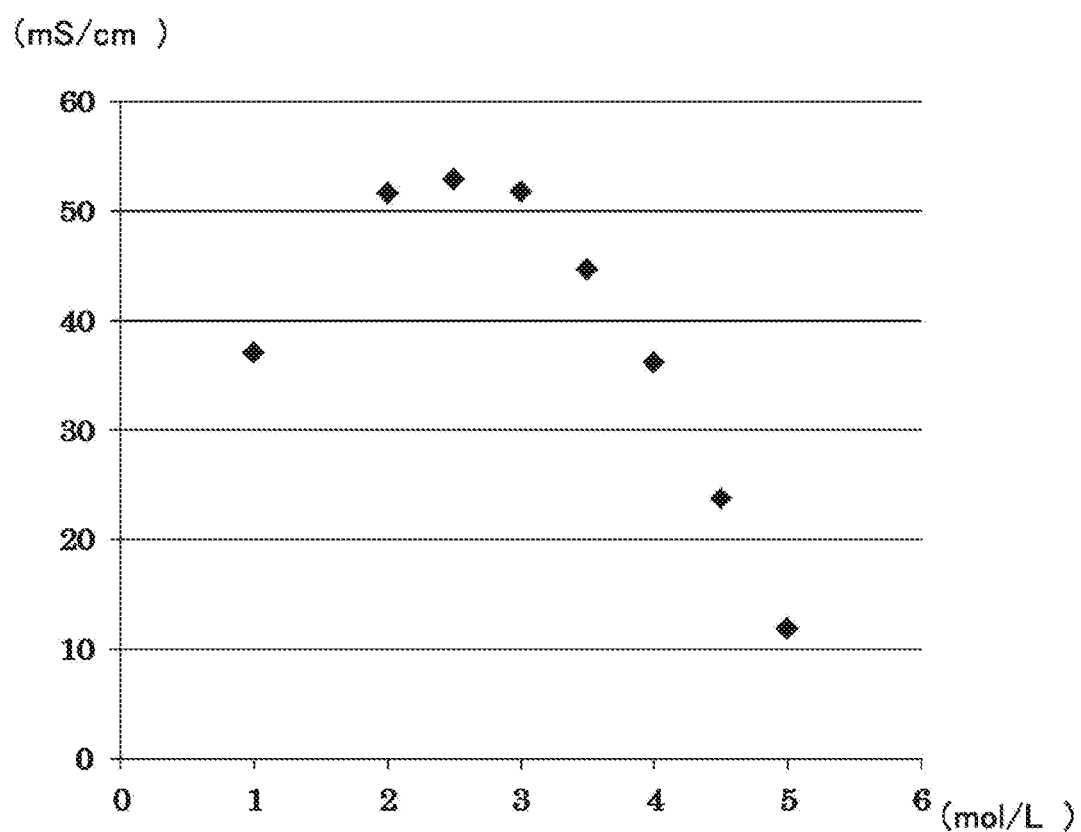
FIG. 1 is a graph showing results of ionic conductivity in Evaluation Example 3.

In the following, embodiments of the present invention are described. The scope of the present invention is not limited to the descriptions of the embodiments and various changes other than those illustrated in the following may be made as appropriate without departing from the gist of the present invention.

1. Electrolytic Solution (1) Solvent

The electrolytic solution for a power storage device of the present invention (hereinafter, sometimes referred to as "electrolytic solution of the present invention") is an aqueous electrolytic solution. Therefore, a main solvent used in the electrolytic solution for the power storage device of the present invention is water. However, the solvent may be a mixed solvent containing water and another solvent that is a nonaqueous solvent. Such a nonaqueous solvent is soluble in water, and examples thereof include: alcohols such as methanol; and aprotic polar solvents including acetone, acetonitrile, dimethyl sulfoxide, or carbonates such as dimethyl carbonate, ethyl methyl carbonate, diethyl carbonate, ethylene carbonate, and propylene carbonate. In the case of the mixed solvent, the proportion of water is preferably not less than 90% in volume ratio.

(2) Alkali Metal Salt

An alkali metal salt used in the electrolytic solution for the power storage device of the present invention is preferably a lithium salt or a sodium salt, but a salt of a metal belonging to Group 2, such as magnesium, may be used. The cation species of the alkali metal salt may be selected in accordance with the type of a charge carrier of a power storage device in which the electrolytic solution of the present invention is used. For example, a lithium salt is preferable when a secondary battery is a lithium ion secondary battery, and a sodium salt is preferable when the secondary battery is a sodium ion secondary battery. In addition, a mixture of a combination of two or more alkali metal salts may be used.

The anion forming the alkali metal salt is preferably an organic anion containing a carbon atom within the structure thereof.

As the organic anion, anions represented by the following general formula (1) to general formula (3) are preferable.

$$(R^1SO_2)(R^2SO_2)N^-$$ general formula (1)

($R^1$ and $R^2$ are each independently selected from an alkyl group or a halogen-substituted alkyl group. $R^1$ and $R^2$ optionally bind with each other to form a ring.)

$$R^3SO_3^-$$ general formula (2)

($R^3$ is selected from an alkyl group or a halogen-substituted alkyl group.)

$$R^4CO_2$$ general formula (3)

($R^4$ is selected from an alkyl group or a halogen-substituted alkyl group.)

In the general formula (1) to general formula (3), the number n of carbon atoms in the alkyl group or the halogen-substituted alkyl group is preferably 1 to 6, more preferably 1 to 3, and further preferably 1 to 2. The halogen of the halogen-substituted alkyl group is preferably fluorine. The substitution number of halogen atoms in the halogen-substituted alkyl group is equal to or less than the number of hydrogen atoms in the original alkyl group.

$R^1$ to $R^4$ are each represented by the following general formula (1-1).

$$C_nH_aF_bCl_cBr_dI_e$$ general formula (1-1)

("n" is an integer not less than 1. "a", "b", "c", "d", and "e" are integers not less than 0. $2n+1=a+b+c+d+e$ is satisfied.)

In the general formula (1-1), from the standpoint of oxidation resistance, "a" is preferably smaller, $a=0$ is more preferable, and $2n+1=b$ is most preferable.

As the organic anion, an organic anion having a fluoroalkyl group is preferable. For example, bis(trifluoromethanesulfonyl)amide (TFSA; $[N(CF_3SO_2)_2]^-$), bis(perfluoroethanesulfonyl)amide (BETA; $[N(C_2F_5SO_2)_2]^-$), or (perfluoroethanesulfonyl)(trifluoromethanesulfonyl)amide ($[N(C_2F_5SO_2)(CF_3SO_2)]^-$) is suitable.

Therefore, specific examples of the alkali metal salt include lithium bis(trifluoromethanesulfonyl)amide (LiTFSA), lithium bis(perfluoroethanesulfonyl)amide (Li-BETA), lithium (perfluoroethanesulfonyl) (trifluoromethanesulfonyl)amide, sodium bis(trifluoromethanesulfonyl)amide (NaTFSA), sodium bis(perfluoroethanesulfonyl)amide (NaBETA), and sodium (perfluoroethanesulfonyl) (trifluoromethanesulfonyl)amide.

Examples of other suitable organic anions include $CF_3SO_3^-$, $C_2F_5SO_3^-$, $CF_3CO_2^-$, and $C_2F_5CO_2^-$.

Specific examples of other alkali metal salts include $CF_3SO_3Li$, $C_2F_5SO_3Li$, $CF_3CO_2Li$, $C_2F_5CO_2Li$, $CF_3SO_3Na$, $C_2F_5SO_3Na$, $CF_3CO_2Na$, and $C_2F_5CO_2Na$.

In addition, the electrolytic solution for the power storage device of the present invention contains an alkali metal salt at a relatively high concentration. Accordingly, even with an electrode configuration with which reversible operation is not conventionally possible with an aqueous electrolytic solution, a power storage device such as a secondary battery that generates a high voltage is achieved.

Regarding the mixing ratio of the alkali metal salt and the solvent in the electrolytic solution of the present invention, the amount of the solvent is greater than 4 mol and not greater than 15 mol, and preferably greater than 4 mol and not greater than 10 mol, with respect to 1 mol of the alkali metal salt.

Moreover, from the description of the present specification, one mode of the electrolytic solution of the present invention is represented as an electrolytic solution for a power storage device, the electrolytic solution containing water as a solvent, wherein the concentration of an alkali metal salt is 2.5 to 4.5 mol/L. From the standpoint of ionic conductivity, the concentration of the alkali metal salt is preferably 2.5 to 4.0 mol/L and more preferably 2.5 to 3.5 mol/L. In addition, from the standpoint of stability at low temperatures, the concentration of the alkali metal salt is preferably 2.6 to 4.1 mol/L and more preferably 3.1 to 3.6 mol/L. When the concentration of the alkali metal salt is comprehensively considered, the concentration of the alkali metal salt is particularly preferably within a range of 3.1 to 3.5 mol/L.

Furthermore, from the description of the present specification, an electrolytic solution for a power storage device, the electrolytic solution containing water as a solvent, the amount of water being greater than 4 mol and not greater than 15 mol with respect to 1 mol of an alkali metal salt, is understood as another mode of the electrolytic solution of the present invention.

The electrolytic solution for the power storage device of the present invention has a potential window exceeding the potential window (stable potential range) of pure water, by using a relatively high concentration of an alkali metal salt, and has a potential window of preferably not less than 1.2 V, more preferably not less than 1.3 V, and further preferably approximately 1.5 V.

In addition to the above-described alkali metal salt, a supporting electrolyte known in the art may be contained. Examples of such a supporting electrolyte in the case where the secondary battery is a lithium ion secondary battery include $LiPF_6$, $LiBF_4$, $LiClO_4$, $LiNO_3$, $LiCl$, $Li_2SO_4$, $Li_2S$, etc., and any combination selected therefrom.

(3) Other Components

In addition, the electrolytic solution for the power storage device of the present invention may contain other components as necessary for the purpose of improvement of the function of the electrolytic solution, etc. Examples of the other components include hitherto known overcharge inhibitors, deoxidizers, and characteristic improvement additives for improving cycle characteristics and capacity retention characteristics after storage at a high temperature.

When the electrolytic solution contains an overcharge inhibitor, the contained amount of the overcharge inhibitor in the electrolytic solution is preferably 0.01 to 5 mass %. When the overcharge inhibitor is contained in the electrolytic solution in an amount of not less than 0.1 mass %, preventing ruptures and ignition of a power storage device due to overcharge becomes easier, and the power storage device is more stably used.

Examples of the characteristic improvement additives for improving cycle characteristics and capacity retention characteristics after storage at a high temperature include: carboxylic anhydrides such as succinic anhydride, glutaric anhydride, maleic anhydride, citraconic anhydride, glutaconic anhydride, itaconic anhydride, diglycolic anhydride, cyclohexanedicarboxylic anhydride, cyclopentanetetracarboxylic dianhydride, and phenyl succinic anhydride; and sulfur-containing compounds such as ethylene sulfite, 1,3-propanesultone, 1,4-butanesultone, methyl methanesulfonate, busulfan, sulfolane, sulfolene, dimethyl sulfone, diphenyl sulfone, methyl phenyl sulfone, dibutyl disulfide, dicyclohexyl disulfide, tetramethylthiuram monosulfide, N,N-dimethyl methanesulfonamide, and N,N-diethyl methanesulfonamide. One of these characteristic improvement additives may be used singly, or two or more of these characteristic improvement additives may be used in combination. When the electrolytic solution contains a characteristic improvement additive, the contained amount of the characteristic improvement additive in the electrolytic solution is preferably 0.01 to 5 mass %.

2. Power Storage Device

The power storage device of the present invention includes a positive electrode, a negative electrode, and the electrolytic solution of the present invention. Examples of the power storage device include secondary batteries and capacitors.

(1) Negative Electrode

An electrode configuration known in the art may be used for the negative electrode in the power storage device of the present invention. Examples of the electrode in the case where the power storage device is a lithium ion secondary battery include an electrode including a negative electrode active material capable of electrochemically occluding and releasing lithium ions. As such a negative electrode active material, a known negative electrode active material for lithium ion secondary batteries may be used, and examples thereof include carbonaceous materials such as natural graphite (graphite), highly oriented graphite (Highly Oriented Pyrolytic Graphite; HOPG), and amorphous carbon. Other examples of the negative electrode active material include alloys or metallic compounds, such as metal oxides, metal sulfides, and metal nitrides, each of which contains element lithium. Examples of the alloys containing element lithium include lithium aluminum alloys, lithium tin alloys, lithium lead alloys, and lithium silicon alloys. Examples of the metal oxides containing element lithium include lithium titanate ($Li_4Ti_5O_{12}$, etc.). Examples of the metal nitride containing element lithium include lithium cobalt nitride, lithium iron nitride, and lithium manganese nitride. Further examples of the negative electrode active material include sulfur-based compounds. In addition, metals such as iron or zinc may be used for the negative electrode. One of these negative electrode active materials may be used singly, or two or more of these negative electrode active materials may be used in combination. Among these negative electrode active materials, lithium titanate is preferable as the negative electrode active material in the case of a lithium ion secondary battery.

When the power storage device is a sodium ion secondary battery, an electrode including a negative electrode active material capable of electrochemically occluding and releasing sodium ions, may be used, and for example, sodium metal, or alloys or metallic compounds, such as metal oxides, metal sulfides, and metal nitrides, each of which contains element sodium, may be used instead of the above-described lithium metal or the like.

When the power storage device is an electric double layer capacitor, the negative electrode includes a polarizable electrode material. The polarizable electrode material may be a polarizable electrode material used for an ordinary electric double layer capacitor, and examples of the polarizable electrode material include activated carbon produced from various raw materials. The activated carbon is preferably activated carbon having a large specific surface area.

When the power storage device is a lithium ion capacitor or a sodium ion capacitor, the negative electrode includes a material capable of occluding and releasing lithium ions or sodium ions. Examples of the material include graphite-containing materials such as natural graphite or artificial graphite. In addition, a material, such as lithium titanate, which exhibits redox capacity at a certain potential by inserting and eliminating cation such as lithium ion, may be used. In the case where the negative electrode active material does not contain ions that contribute to redox, for example, in the case of a lithium ion capacitor, when a material not containing lithium is used as the negative electrode active material, a negative electrode or a positive electrode to which metal lithium or a compound containing lithium in a large amount is added and in which a negative electrode active material is doped in advance with lithium therefrom may be used.

When the power storage device is a secondary battery, the negative electrode may be a negative electrode including only the negative electrode active material, or may be in a form including, in addition to the negative electrode active material, at least one of a conductive material and a binding material (binder), attached to a negative electrode current collector as a negative electrode mixture. For example, when the negative electrode active material is in the form of a foil, a negative electrode only having the negative electrode active material may be formed. On the other hand, when the negative electrode active material is in the form of powder, a negative electrode having the negative electrode active material and the binding material (binder) may be formed. As a method for forming the negative electrode using a powder negative electrode active material, a doctor blade method, a molding method using compression bonding pressing, etc. may be used. The same applies to the case where the power storage device is a capacitor.

As the conductive material, for example, carbon materials, conductive fibers of metal fibers and the like, metal powders of copper, silver, nickel, aluminum, and the like, and organic conductive materials such as polyphenylene derivatives may be used. As a carbon material, graphite, soft carbon, hard carbon, carbon black, Ketchen black, acetylene black, graphite, activated carbon, carbon nanotube, carbon fiber, and the like may be used. Furthermore, mesoporous carbon obtained through baking petroleum pitch or a synthetic resin containing an aromatic ring, etc. may also be used.

As the binding agent, for example, a fluorine-based resin such as polyvinylidene fluoride (PVDF), polytetrafluoroethylene (PTFE), and ethylene tetrafluoroethylene (ETFE), polyethylene, polypropylene, or the like may be suitably used. As the negative electrode current collector, a rod-like body, a plate-like body, a foil-like body, a net-like body, or the like mainly formed from a metal such as copper, nickel, aluminum, zinc, titanium, platinum, and stainless steel may be used.

(2) Positive Electrode

An electrode configuration known in the art may be used for the positive electrode of the power storage device of the present invention. Examples of a positive electrode active material in the case where the power storage device is a lithium ion secondary battery include: lithium-containing transition metal oxides containing one or more transition metals, such as lithium cobaltate ($LiCoO_2$), lithium manganate ($LiMn_2O_4$), lithium nickelate ($LiNiO_2$), and $LiNiO_{0.5}Mn_{1.5}O_4$; transition metal sulfides; metal oxides; lithium-containing polyanion-based compounds containing one or more transition metals such as iron phosphate lithium ($LiFePO_4$) and iron pyrophosphate lithium ($Li_2FeP_2O_7$); and sulfur-based compounds ($Li_2S$). The positive electrode may contain a conductive material or a binding agent.

In addition, oxygen or an oxygen-containing metal salt such as lithium oxide may be used as the positive electrode active material. The positive electrode including the positive electrode active material may contain a catalyst for accelerating redox reaction of oxygen in the positive electrode active material. Examples of preferable positive electrode active materials include transition metal oxides excessively containing lithium (the transition metal is, for example, manganese, cobalt, iron, nickel, or copper). Moreover, for efficiently causing redox of oxygen in the atmosphere to create a reaction field for taking out capacity, a material having a high specific surface area such as activated carbon may be used in the positive electrode.

Also when the power storage device is a sodium ion secondary battery, a known positive electrode active material may be used similarly.

When the power storage device is a capacitor, the positive electrode contains a polarizable electrode material. As the polarizable electrode material, the polarizable electrode material described for the negative electrode may be used. In addition, a material such as 2,2,6,6-tetramethylpiperidine-N-oxyl (TEMPO) used in a redox capacitor in which a large capacity is obtained through adsorption and desorption of anion, or a conductive polymer such as polyacene, may be used as the polarizable electrode material. Moreover, a material, such as lithium manganate having a spinel structure and iron phosphate lithium having an olivine structure, which exhibits redox capacity at a certain potential of not less than 3 V by inserting and eliminating cation such as lithium ion, may be included.

As the conductive material and the binding agent (binder), the same ones used for the negative electrode may be used.

As the catalyst for accelerating redox reaction of oxygen, $MnO_2$, $Fe_2O_3$, NiO, CuO, Pt, Co, and the like may be used. As the binding agent (binder), a binder that is the same as that for the negative electrode may be used.

As a positive electrode current collector, a rod-like body, a plate-like body, a foil-like body, a net-like body, or the like mainly formed from a metal such as nickel, aluminum, titanium, platinum, and stainless steel may be used. In addition, when the positive electrode active material is oxygen, a porous body such as a mesh-like (grid-like) metal, a sponge-like (foamed) metal, a punched metal, and an expanded metal is used as the positive electrode current collector, for the purpose of enhancing diffusion of oxygen. The metal is, for example, copper, nickel, aluminum, stainless steel, or the like.

(3) Separator

A separator used in the power storage device of the present invention is not particularly limited as long as the separator has a function of electrically separating a positive electrode layer and a negative electrode layer, and examples of the separator include porous insulators such as nonwoven fabrics including glass fiber nonwoven fabrics, and nonwoven fabrics and porous sheets formed of resins such as polyethylene (PE), polypropylene (PP), polyester, cellulose, and polyamide.

(4) Shape etc.

The shape of the power storage device of the present invention is not particularly limited as long as the positive electrode, the negative electrode, and the electrolytic solution are housed, and examples thereof include a cylindrical type, a coin type, a plate type, and a laminated type.

Furthermore, a case for housing the power storage device may be an atmosphere-exposed type case, or may be a sealed type case.

In the case of an air battery in which a positive electrode active material is oxygen, an atmosphere-exposed type battery case is a battery case having a ventilation hole that allows air to flow in and out therethrough, enabling air to come into contact with the positive electrode. On the other hand, when the battery case is a sealed type battery case, a supply tube and an emission tube for gas (air) are preferably provided to the sealed type battery case. In this case, the gas that is to be supplied or emitted is preferably a dry gas in which the concentration of oxygen is preferably high, and is more preferably pure oxygen (99.99%). Furthermore, the oxygen concentration is preferably set high during discharging and set low during charging.

Although the electrolytic solution and the secondary battery of the present invention are suitable in usage as a secondary battery, usage as a primary battery is not excluded.

EXAMPLES

The present invention is described below in further detail by means of Examples, etc., but is not limited thereto.

Production Example 1

An aqueous solution containing LiTFSA at a concentration of 5.13 mol/L was prepared by dissolving LiTFSA as an alkali metal salt in water. The aqueous solution was used as an electrolytic solution of Production Example 1. The electrolytic solution of Production Example 1 contains 2.7 mol of water with respect to 1 mol of LiTFSA.

Production Example 2

An aqueous solution containing LiTFSA at a concentration of 4.62 mol/L was prepared by mixing 9 parts by volume of the electrolytic solution of Production Example 1 and 1 part by volume of water. The aqueous solution was used as an electrolytic solution of Production Example 2. The electrolytic solution of Production Example 2 contains 3.9 mol of water with respect to 1 mol of LiTFSA.

Production Example 3: Example 1

An aqueous solution containing LiTFSA at a concentration of 4.10 mol/L was prepared by mixing 8 parts by volume of the electrolytic solution of Production Example 1 and 2 parts by volume of water. The aqueous solution was used as an electrolytic solution of Production Example 3. The electrolytic solution of Production Example 3 contains 5.4 mol of water with respect to 1 mol of LiTFSA.

Production Example 4: Example 2

An aqueous solution containing LiTFSA at a concentration of 3.59 mol/L was prepared by mixing 7 parts by volume of the electrolytic solution of Production Example 1 and 3 parts by volume of water. The aqueous solution was used as an electrolytic solution of Production Example 4. The electrolytic solution of Production Example 4 contains 7.3 mol of water with respect to 1 mol of LiTFSA.

Production Example 5: Example 3

An aqueous solution containing LiTFSA at a concentration of 3.08 mol/L was prepared by mixing 6 parts by volume of the electrolytic solution of Production Example 1 and 4 parts by volume of water. The aqueous solution was used as an electrolytic solution of Production Example 5. The electrolytic solution of Production Example 5 contains 9.9 mol of water with respect to 1 mol of LiTFSA.

Production Example 6: Example 4

An aqueous solution containing LiTFSA at a concentration of 2.57 mol/L was prepared by mixing 5 parts by volume of the electrolytic solution of Production Example 1 and 5 parts by volume of water. The aqueous solution was used as an electrolytic solution of Production Example 6. The electrolytic solution of Production Example 6 contains 13.5 mol of water with respect to 1 mol of LiTFSA.

Production Example 7

An aqueous solution containing LiTFSA at a concentration of 2.05 mol/L was prepared by mixing 4 parts by volume of the electrolytic solution of Production Example 1 and 6 parts by volume of water. The aqueous solution was used as an electrolytic solution of Production Example 7. The electrolytic solution of Production Example 7 contains 18.9 mol of water with respect to 1 mol of LiTFSA.

Production Example 8

An aqueous solution containing LiTFSA at a concentration of 1.54 mol/L was prepared by mixing 3 parts by volume of the electrolytic solution of Production Example 1 and 7 parts by volume of water. The aqueous solution was used as an electrolytic solution of Production Example 8. The electrolytic solution of Production Example 8 contains 28.0 mol of water with respect to 1 mol of LiTFSA.

Production Example 9

An aqueous solution containing LiTFSA at a concentration of 1.03 mol/L was prepared by mixing 2 parts by volume of the electrolytic solution of Production Example 1 and 8 parts by volume of water. The aqueous solution was used as an electrolytic solution of Production Example 9. The electrolytic solution of Production Example 9 contains 46.0 mol of water with respect to 1 mol of LiTFSA.

Production Example 10

An aqueous solution containing LiTFSA at a concentration of 0.51 mol/L was prepared by mixing 1 part by volume of the electrolytic solution of Production Example 1 and 9 parts by volume of water. The aqueous solution was used as an electrolytic solution of Production Example 10. The electrolytic solution of Production Example 10 contains 100.2 mol of water with respect to 1 mol of LiTFSA.

Production Example 11: Example 5

An aqueous solution containing LiTFSA at a concentration of 3.68 mol/L was prepared by dissolving LiTFSA as an alkali metal salt in water. The aqueous solution was used as an electrolytic solution of Production Example 11. The electrolytic solution of Production Example 11 contains 6.9 mol of water with respect to 1 mol of LiTFSA.

Production Example 12

An aqueous solution containing LiTFSA at a concentration of 1.00 mol/L was prepared by dissolving LiTFSA as an alkali metal salt in water. The aqueous solution was used as an electrolytic solution of Production Example 12. The electrolytic solution of Production Example 12 contains 47.4 mol of water with respect to 1 mol of LiTFSA.

Production Example 13

An aqueous solution containing LiTFSA at a concentration of 2.00 mol/L was prepared by dissolving LiTFSA as an alkali metal salt in water. The aqueous solution was used as an electrolytic solution of Production Example 13. The electrolytic solution of Production Example 13 contains 19.6 mol of water with respect to 1 mol of LiTFSA.

Production Example 14: Example 6

An aqueous solution containing LiTFSA at a concentration of 2.50 mol/L was prepared by dissolving LiTFSA as an alkali metal salt in water. The aqueous solution was used as an electrolytic solution of Production Example 14. The electrolytic solution of Production Example 14 contains 14.1 mol of water with respect to 1 mol of LiTFSA.

Production Example 15: Example 7

An aqueous solution containing LiTFSA at a concentration of 3.00 mol/L was prepared by dissolving LiTFSA as an alkali metal salt in water. The aqueous solution was used as an electrolytic solution of Production Example 15. The electrolytic solution of Production Example 15 contains 10.4 mol of water with respect to 1 mol of LiTFSA.

Production Example 16: Example 8

An aqueous solution containing LiTFSA at a concentration of 3.50 mol/L was prepared by dissolving LiTFSA as an alkali metal salt in water. The aqueous solution was used as an electrolytic solution of Production Example 16. The electrolytic solution of Production Example 16 contains 7.7 mol of water with respect to 1 mol of LiTFSA.

Production Example 17: Example 9

An aqueous solution containing LiTFSA at a concentration of 4.00 mol/L was prepared by dissolving LiTFSA as an alkali metal salt in water. The aqueous solution was used as an electrolytic solution of Production Example 17. The electrolytic solution of Production Example 17 contains 5.7 mol of water with respect to 1 mol of LiTFSA.

Production Example 18: Example 10

An aqueous solution containing LiTFSA at a concentration of 4.50 mol/L was prepared by dissolving LiTFSA as an alkali metal salt in water. The aqueous solution was used as an electrolytic solution of Production Example 18. The electrolytic solution of Production Example 18 contains 4.2 mol of water with respect to 1 mol of LiTFSA.

Production Example 19

An aqueous solution containing LiTFSA at a concentration of 5.00 mol/L was prepared by dissolving LiTFSA as an alkali metal salt in water. The aqueous solution was used as an electrolytic solution of Production Example 19. The electrolytic solution of Production Example 19 contains 2.9 mol of water with respect to 1 mol of LiTFSA.

Production Example 20: Example 11

An aqueous solution in which a value of (number of moles of water)/(number of moles of alkali metal salt) is 5 was prepared by mixing LiTFSA and LiBETA as alkali metal salts in a mole ratio of 7:3 to obtain a mixture and adding water to the mixture. The aqueous solution was used as an electrolytic solution of Production Example 20.

Production Example 21

An aqueous solution in which a value of (number of moles of water)/(number of moles of alkali metal salt) is 50 was prepared by mixing LiTFSA and LiBETA as alkali metal salts in a mole ratio of 7:3 to obtain a mixture and adding water to the mixture. The aqueous solution was used as an electrolytic solution of Production Example 21.

Production Example 22

An aqueous solution in which a value of (number of moles of water)/(number of moles of alkali metal salt) is 19 was prepared by adding water to $Li_2SO_4$ as an alkali metal salt. The aqueous solution was used as an electrolytic solution of Production Example 22.

Production Example 23: Example 12

An aqueous solution in which a value of (number of moles of water)/(number of moles of alkali metal salt) is 4.5 was prepared by adding water to $LiNO_3$ as an alkali metal salt. The aqueous solution was used as an electrolytic solution of Production Example 23.

Table 1 shows a list of the electrolytic solutions. An empty cell means that the value is uncalculated.

TABLE 1

| | Type of alkali metal salt | Concentration of alkali metal salt | Mole ratio of water/alkali metal salt |
|---|---|---|---|
| Production Example 1 | LiTFSA | 5.13 mol/L | 2.7 |
| Production Example 2 | LiTFSA | 4.62 mol/L | 3.9 |
| Production Example 3 (Example 1) | LiTFSA | 4.10 mol/L | 5.4 |
| Production Example 4 (Example 2) | LiTFSA | 3.59 mol/L | 7.3 |
| Production Example 5 (Example 3) | LiTFSA | 3.08 mol/L | 9.9 |
| Production Example 6 (Example 4) | LiTFSA | 2.57 mol/L | 13.5 |
| Production Example 7 | LiTFSA | 2.05 mol/L | 18.9 |
| Production Example 8 | LiTFSA | 1.54 mol/L | 28.0 |
| Production Example 9 | LiTFSA | 1.03 mol/L | 46.0 |
| Production Example 10 | LiTFSA | 0.51 mol/L | 100.2 |
| Production Example 11 (Example 5) | LiTFSA | 3.68 mol/L | 6.9 |
| Production Example 12 | LiTFSA | 1.00 mol/L | 47.4 |
| Production Example 13 | LiTFSA | 2.00 mol/L | 19.6 |
| Production Example 14 (Example 6) | LiTFSA | 2.50 mol/L | 14.1 |
| Production Example 15 (Example 7) | LiTFSA | 3.00 mol/L | 10.4 |
| Production Example 16 (Example 8) | LiTFSA | 3.50 mol/L | 7.7 |
| Production Example 17 (Example 9) | LiTFSA | 4.00 mol/L | 5.7 |
| Production Example 18 (Example 10) | LiTFSA | 4.50 mol/L | 4.2 |
| Production Example 19 | LiTFSA | 5.00 mol/L | 2.9 |
| Production Example 20 (Example 11) | LiTFSA and LiBETA | | 5 |
| Production Example 21 | LiTFSA and LiBETA | | 50 |
| Production Example 22 | $Li_2SO_4$ | | 19 |
| Production Example 23 (Example 12) | $LiNO_3$ | | 4.5 |

Evaluation Example 1: Differential Scanning Calorimetry Measurement

With respect to the electrolytic solutions of Production Examples 1 to 10, differential scanning calorimetry measurement was performed by the following method. Each electrolytic solution was placed in an aluminum pan, and the pan was sealed. Using an empty sealed pan as a control, differential scanning calorimetry analysis was performed in a nitrogen atmosphere using the following temperature program. As a differential scanning calorimeter, DSC Q2000 (manufactured by TA Instruments) was used.

Temperature Program

Decrease the temperature from room temperature to −75° C. at 5° C./min and keep the temperature for 10 minutes→ increase the temperature to 70° C. at 5° C./min.

The DSC curve obtained when the temperature was increased from −75° C. to 70° C. at 5° C./min was observed. Table 2 shows the results. The melting point in Table 2 is the temperature at the top of an endothermic peak.

TABLE 2

| | Mole ratio of water/alkali metal salt | Melting point | Height of endothermic peak |
|---|---|---|---|
| Production Example 1 | 2.7 | −8.29° C. | 16.14 |
| Production Example 2 | 3.9 | −8.64° C. | 16.62 |
| Production Example 3 (Example 1) | 5.4 | −16.47° C. | 6.15 |
| Production Example 4 (Example 2) | 7.3 | Not observed | 0 |
| Production Example 5 (Example 3) | 9.9 | Not observed | 0 |
| Production Example 6 (Example 4) | 13.5 | −30.89° C. | 2.339 |
| Production Example 7 | 18.9 | −13.76° C. | 5.306 |
| Production Example 8 | 28.0 | −7.13° C. | 8.894 |
| Production Example 9 | 46.0 | −7.91° C. | 8.371 |
| Production Example 10 | 100.2 | −1.7° C. | 16.8 |

From the results of Table 2, the electrolytic solution of the present invention is found to have a significantly low melting point and thus be less likely to be solidified even at a low temperature.

Evaluation Example 2: Solidification Evaluation at Low Temperature

The electrolytic solutions of Production Examples 2 to 10 were kept overnight in a temperature controlled bath at −40° C. Thereafter, the properties of each electrolytic solution were visually observed. Table 3 shows the results.

TABLE 3

| | Mole ratio of water/alkali metal salt | Observation results |
|---|---|---|
| Production Example 2 | 3.9 | Slightly frozen |
| Production Example 3 (Example 1) | 5.4 | Liquid |
| Production Example 4 (Example 2) | 7.3 | Liquid |
| Production Example 5 (Example 3) | 9.9 | Liquid |
| Production Example 6 (Example 4) | 13.5 | Slightly frozen |
| Production Example 7 | 18.9 | Frozen |
| Production Example 8 | 28.0 | Frozen |
| Production Example 9 | 46.0 | Frozen |
| Production Example 10 | 100.2 | Frozen |

From the results of Table 3, the electrolytic solution of the present invention is found to be less likely to be solidified even in an environment in which −40° C. is kept.

Evaluation Example 3: Ionic Conductivity

With respect to the electrolytic solutions of Production Examples 12 to 19, ionic conductivity was measured at room temperature. Table 4 and FIG. 1 show the results.

TABLE 4

| | Concentration of alkali metal salt | Mole ratio of water/alkali metal salt | Ionic conductivity (mS/cm) |
|---|---|---|---|
| Production Example 12 | 1.00 mol/L | 47.4 | 37.1 |
| Production Example 13 | 2.00 mol/L | 19.6 | 51.6 |
| Production Example 14 (Example 6) | 2.50 mol/L | 14.1 | 52.9 |
| Production Example 15 (Example 7) | 3.00 mol/L | 10.4 | 51.7 |
| Production Example 16 (Example 8) | 3.50 mol/L | 7.7 | 44.6 |
| Production Example 17 (Example 9) | 4.00 mol/L | 5.7 | 36.2 |
| Production Example 18 (Example 10) | 4.50 mol/L | 4.2 | 23.7 |
| Production Example 19 | 5.00 mol/L | 2.9 | 11.9 |

From the results of Table 4 and FIG. 1, the maximum of ionic conductivity is suggested to be present at approximately 2.5 mol/L. In addition, the electrolytic solution of the present invention is considered to have sufficient ionic conductivity.

Evaluation Example 4: Cyclic Voltammetry 1

Figure 2:
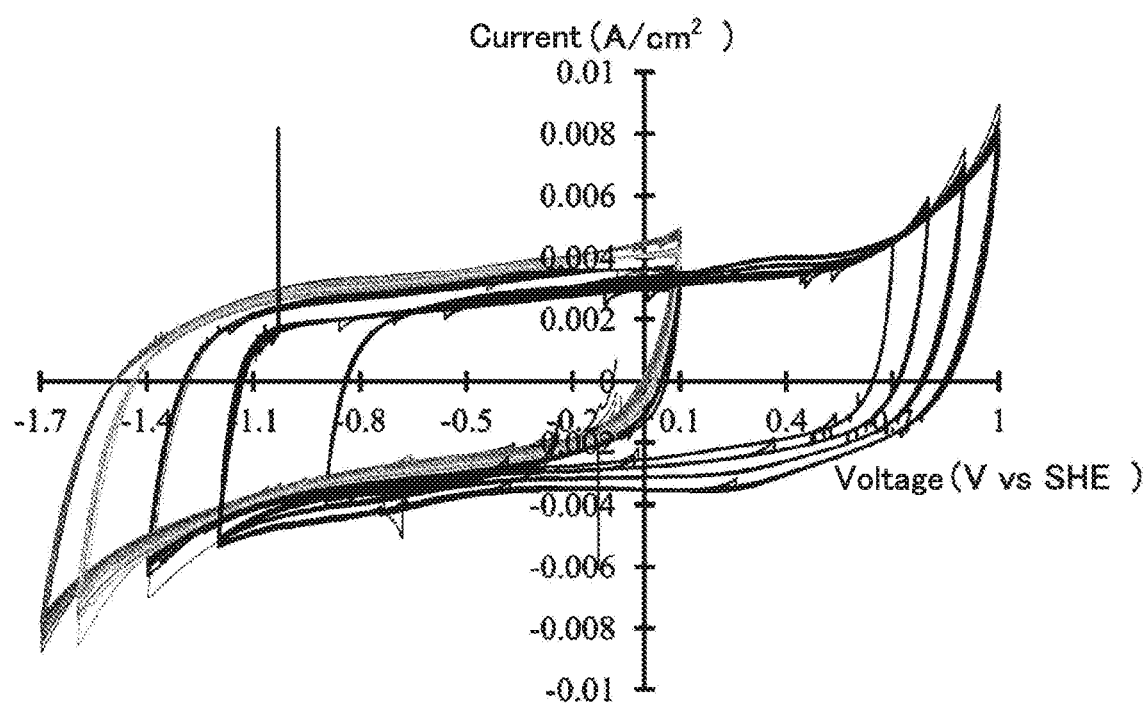
FIG. 2 is a graph showing results of cyclic voltammetry in Evaluation Example 4.

Cyclic voltammetry was performed using the following three-electrode type electrochemical cell including the electrolytic solution of the present invention. The potential range was set to a plurality of ranges of −1.7 V to 1 V as a voltage with respect to a standard hydrogen electrode. The sweep rate was set at 5 mV/second. FIG. 2 shows the results.

Electrolytic Solution: the Electrolytic Solution of Production Example 11

Working electrode: an electric double layer capacitor electrode including a mixture layer containing 86 mass % of activated carbon, and an Al foil (manufactured by Hohsen Corp.: the density of the mixture layer is 0.63 g/cm$^3$).

Reference electrode: Ag/AgCl (saturated KCl)

Counter electrode: platinum

From the results of FIG. 2, occurrence of a large current was not observed at least within a range of −1.2 V to 0.7 V. The electrolytic solution of Production Example 11 is considered to exhibit a potential window of approximately 2V with respect to the activated carbon electrode.

(Evaluation Example 5: Electric Double Layer Capacitor Evaluation)

An electric double layer capacitor having the following configuration was produced and used as a capacitor of Example A. The capacitor of Example A was tested under the following conditions.

Positive electrode: an electric double layer capacitor electrode including a mixture layer containing 86 mass % of activated carbon, and an Al foil (manufactured by Hohsen Corp.: the density of the mixture layer is 0.63 g/cm$^3$).

Negative electrode: an electric double layer capacitor electrode including a mixture layer containing 86 mass % of activated carbon, and an Al foil (manufactured by Hohsen Corp.: the density of the mixture layer is 0.63 g/cm$^3$).

Electrolytic Solution: the Electrolytic Solution of Production Example 11

Conditions: As conditioning, charging and discharging was performed 10 times at a current of 10 mA/g and in a voltage range of 0 to 1 V on the electric double layer capacitor. Charging and discharging was repeated 5 times at each charging/discharging current and in each voltage range described below on the electric double layer capacitor after the conditioning.

Discharging current in the case of a charging current of 100 mA/g: 100 mA/g, 500 mA/g, 1000 mA/g, 2000 mA/g, approximately 3600 mA/g Charging current in the case of a discharging current of 100 mA/g: 100 mA/g, 500 mA/g, 1000 mA/g, 2000 mA/g, approximately 3600 mA/g Voltage range: 0 to 1.2 V, 0 to 1.5V, 0 to 1.6 V In addition, an electric double layer capacitor having the same configuration as described above except that the electrolytic solution of Production Example 1 was used as an electrolytic solution was produced and used as a capacitor of Comparative Example A. Charging and discharging was performed in a range of 0 to 1.2 V under the same conditions as described above on the capacitor of Comparative Example A.

Figure 3:
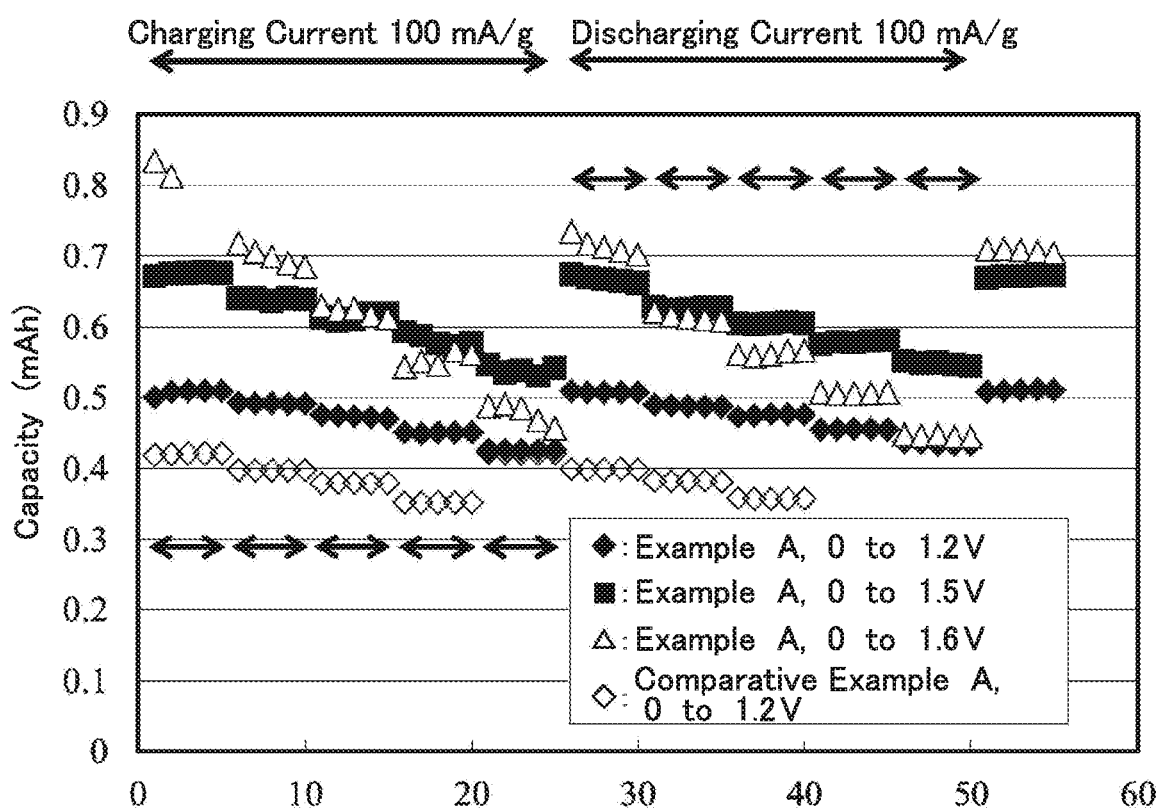
FIG. 3 is a graph showing results of electric double layer capacitor evaluation in Evaluation Example 5.

FIG. 3 shows the results of the above. In FIG. 3, in a range of a large arrow for a charging current of 100 mA/g, five ranges of small arrows mean discharging currents of 100 mA/g, 500 mA/g, 1000 mA/g, 2000 mA/g, and approximately 3600 mA/g in order from the left. Similarly, in FIG. 3, in a range of a large arrow for a discharging current 100 mA/g, five ranges of small arrows mean charging currents of 100 mA/g, 500 mA/g, 1000 mA/g, 2000 mA/g, and approximately 3600 mA/g in order from the left.

From the results of FIG. 3, the capacitor of Example A was confirmed to be suitably charged and discharged under any of the current conditions and in any of the voltages ranges. In addition, when the capacitance of the capacitor of Example A and the capacitance of the capacitor of Comparative Example A in the voltage range of 0 to 1.2 V were compared to each other, the capacitor of Example A was found to be better. Accordingly, the electrolytic solution of the present invention is confirmed to be excellent.

Evaluation Example 6: Cyclic Voltammetry 2

Cyclic voltammetry was performed using the following three-electrode type electrochemical cell including the electrolytic solution of the present invention. The potential range was set to −0.9 V to 0 V and 0.2 to 1.3 V as a voltage with respect to a standard hydrogen electrode. The sweep rate was set at 5 mV/second. FIG. 3 shows the results.

Electrolytic Solution: the Electrolytic Solution of Production Example 11

Working electrode: a stack of four aluminum foils each having an area of 1 cm$^2$ and a thickness of 15 μm Reference electrode: Ag/AgCl (saturated KCl)

Counter electrode: platinum

Figure 4:
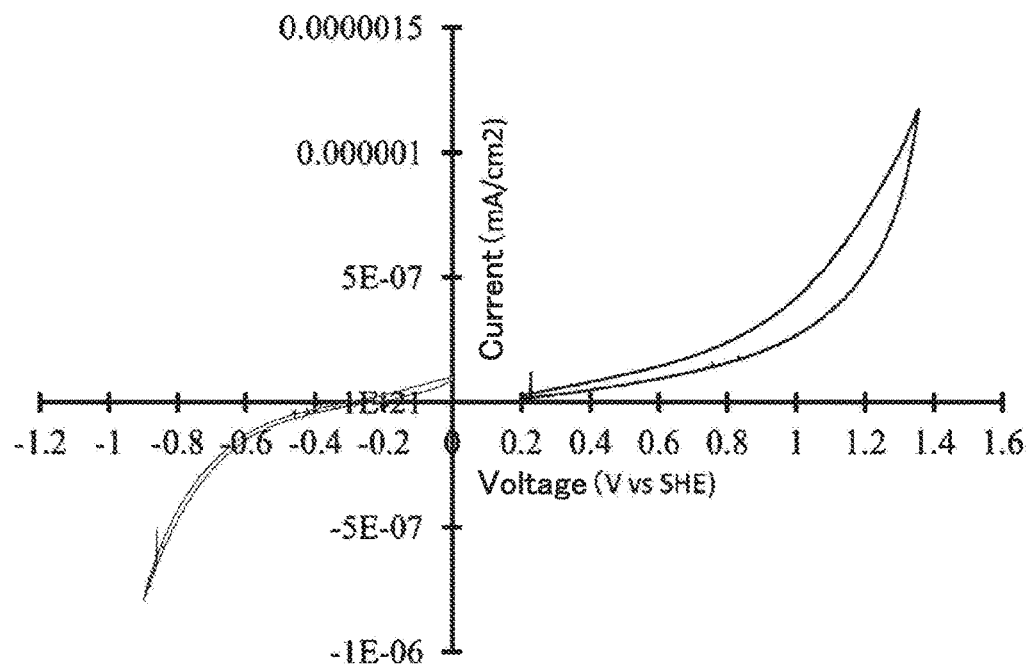
FIG. 4 is a graph showing results of cyclic voltammetry in Evaluation Example 6.

From FIG. 4, the electrolytic solution of Production Example 11 is found to have exhibited a potential window of at least approximately 2.2 V in the presence of aluminum, and occurrence of only a very slight current is found to have been observed (pay attention to the unit and the value at the vertical axis in FIG. 4). In addition, a similar cyclic voltammogram was observed even when a cycle of cyclic voltammetry was repeated. These results mean that decomposition of water hardly occurred and almost no aluminum was corroded.

Therefore, the electrolytic solution of the present invention is considered to cause no particular decomposition of the solvent in the presence of aluminum and cause no particular corrosion of aluminum. The electrolytic solution of the present invention is confirmed to be also suitably usable for a power storage device including a current collector made of aluminum.

Evaluation Example 7: Cyclic Voltammetry 3

The following three-electrode type electrochemical cells were produced, and cyclic voltammetry measurement was performed for these cells. The measurement temperature was set at 25° C., and the sweep rate was set at 0.1 mV/second. FIGS. 5 to 8 show the results.

Electrolytic Solution: Production Example 17, Production Example 20, Production Example 21, or Production Example 22

Working electrode: an electrode including a negative electrode mixture layer containing 85 mass % of $Li_4Ti_5O_{12}$, 5 mass % of PVDF, and 10 mass % of acetylene black, and a current collector made of Zn.

Counter electrode: an electrode including a mixture layer containing 85 mass % of $LiMn_2O_4$, 10 mass % of PVDF, and 5 mass % of acetylene black, and a current collector made of Ti.

Reference electrode: Ag/AgCl (saturated KCl)

Figure 5:
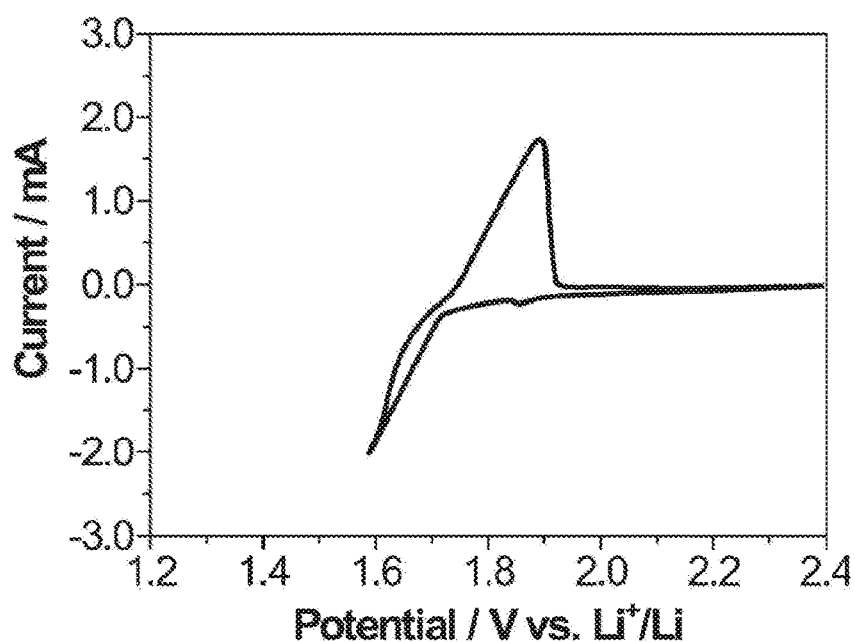
FIG. 5 is a graph showing results of cyclic voltammetry of a cell including an electrolytic solution of Production Example 17 in Evaluation Example 7.
Figure 6:
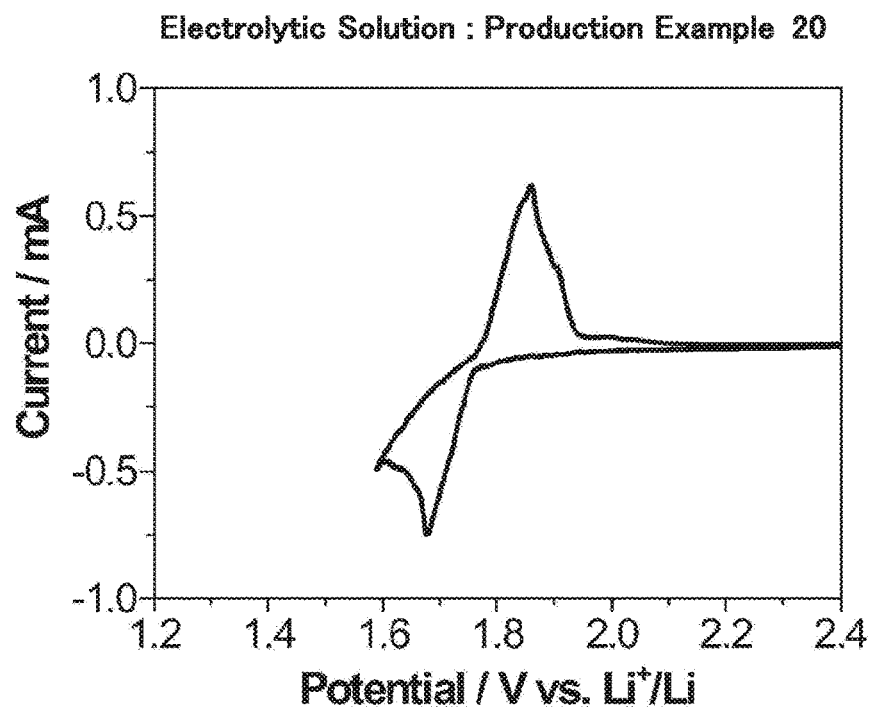
FIG. 6 is a graph showing results of cyclic voltammetry of a cell including an electrolytic solution of Production Example 20 in Evaluation Example 7.
Figure 7:
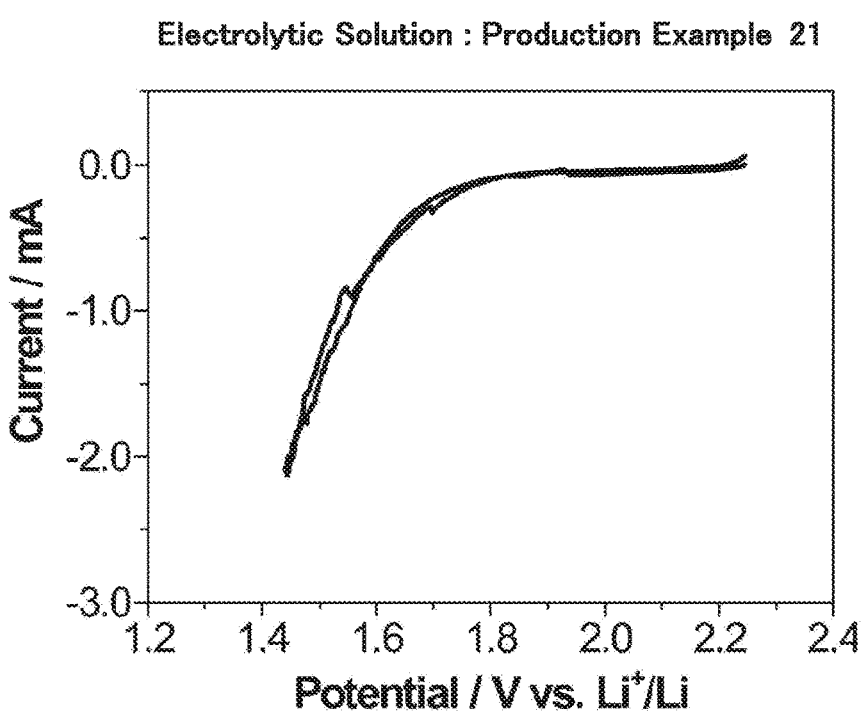
FIG. 7 is a graph showing results of cyclic voltammetry of a cell including an electrolytic solution of Production Example 21 in Evaluation Example 7.
Figure 8:
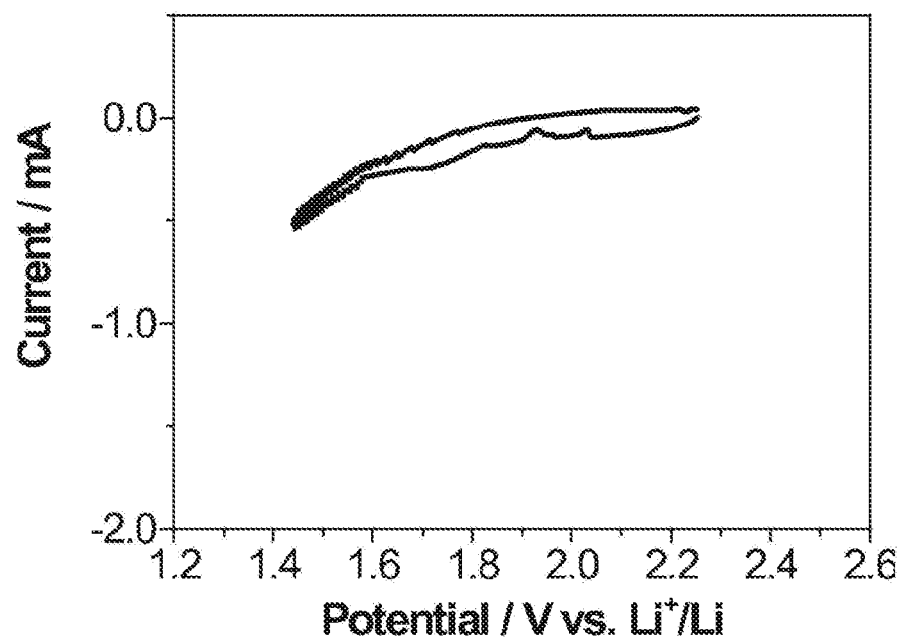
FIG. 8 is a graph showing results of cyclic voltammetry of a cell including an electrolytic solution of Production Example 22 in Evaluation Example 7.

As shown in FIG. 6, in the cell including the electrolytic solution of Production Example 20, the clearest redox behavior was observed. In addition, as shown in FIG. 5, in the cell including the electrolytic solution of Production Example 17, clear redox behavior was observed. On the other hand, in the cell including the electrolytic solution of Production Example 21 in FIG. 7 and the cell including the electrolytic solution of Production Example 22 in FIG. 8, no redox behavior was observed. Table 5 shows a list of the results.

TABLE 5

| Electrolytic solution | Type of alkali metal salt | Mole ratio of water/alkali metal salt | Redox behavior |
| --- | --- | --- | --- |
| Production Example 17 (Example 9) | LiTFSA | 5.7 | Good |
| Production Example 20 (Example 11) | LiTFSA and LiBETA | 5 | Excellent |
| Production Example 21 | LiTFSA and LiBETA | 50 | Not observed |

TABLE 5-continued

| Electrolytic solution | Type of alkali metal salt | Mole ratio of water/alkali metal salt | Redox behavior |
|---|---|---|---|
| Production Example 22 | Li$_2$SO$_4$ | 19 | Not observed |

The above results are considered to demonstrate the secondary battery including the electrolytic solution of the present invention operates reversibly.

While the specific embodiments of the present invention have been described in detail, these embodiments are merely illustrative and are not intended to limit the scope of the claims. The invention described in the claims may include various modifications and changes made to the specific embodiments illustrated above.

The invention claimed is:

1. An electrolytic solution for a power storage device, the electrolytic solution containing water as a solvent, wherein
    an amount of the solvent is greater than 4 mol and not greater than 15 mol with respect to 1 mol of an alkali metal salt, and
    an anion forming the alkali metal salt is an organic anion having a fluoroalkyl group.

2. An electrolytic solution for a power storage device, the electrolytic solution containing water as a solvent, wherein
    a concentration of an alkali metal salt is 2.5 to 4.5 mol/L, and
    an anion forming the alkali metal salt is an organic anion having a fluoroalkyl group.

3. The electrolytic solution for the power storage device according to claim 1, wherein the organic anion is represented by general formula (1) to general formula (3) below:

(R$^1$SO$_2$)(R$^2$SO$_2$)N$^-$          general formula (1)

(R$^1$ and R$^2$ are each independently selected from an alkyl group or a halogen-substituted alkyl group, R$^1$ and R$^2$ optionally bind with each other to form a ring);

R$^3$SO$_3^-$          general formula (2)

(R$^3$ is selected from an alkyl group or a halogen-substituted alkyl group); and

R$^4$CO$_2^-$          general formula (3)

(R$^4$ is selected from an alkyl group or a halogen-substituted alkyl group).

4. The electrolytic solution for the power storage device according to claim 1, wherein the organic anion is bis(trifluoromethanesulfonyl)amide ([N(CF$_3$SO$_2$)$_2$]$^-$), bis(perfluoroethanesulfonyl)amide ([N(C$_2$F$_5$SO$_2$)$_2$]$^-$), (perfluoroethanesulfonyl)(trifluoromethanesulfonyl)amide ([N(C$_2$F$_5$SO$_2$)(CF$_3$SO$_2$)]$^-$), CF$_3$SO$_3^-$, C$_2$F$_5$SO$_3^-$, CF$_3$CO$_2^-$, and/or C$_2$F$_5$CO$_2^-$.

5. The electrolytic solution for the power storage device according to claim 1, wherein the alkali metal salt is a lithium salt or a sodium salt.

6. The electrolytic solution for the power storage device according to claim 1, wherein the alkali metal salt is a combination of two or more alkali metal salts.

7. The electrolytic solution for the power storage device according to claim 1, wherein the power storage device is a secondary battery or a capacitor.

8. The electrolytic solution for the power storage device according to claim 1, wherein the power storage device is a lithium ion secondary battery or a sodium ion secondary battery.

9. A power storage device comprising a positive electrode, a negative electrode, and the electrolytic solution for the power storage device according to claim 1.

10. The power storage device according to claim 9, wherein the power storage device is a secondary battery or a capacitor.

11. The power storage device according to claim 10, wherein the secondary battery is a lithium ion secondary battery or a sodium ion secondary battery.

12. The power storage device according to claim 10, wherein the capacitor is an electric double layer capacitor, a lithium ion capacitor, or a sodium ion capacitor.

13. The power storage device according to claim 9, wherein the power storage device is a capacitor, and the positive electrode and/or the negative electrode contains activated carbon.

14. The power storage device according to claim 9, further comprising a current collector made of aluminum.

* * * * *